(12) United States Patent
O'Toole, Jr. et al.

(10) Patent No.: US 7,254,636 B1
(45) Date of Patent: Aug. 7, 2007

(54) METHOD AND APPARATUS FOR TRANSPARENT DISTRIBUTED NETWORK-ATTACHED STORAGE WITH WEB CACHE COMMUNICATION PROTOCOL/ANYCAST AND FILE HANDLE REDUNDANCY

(75) Inventors: James W. O'Toole, Jr., Somerville, MA (US); David M. Bornstein, Westwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 830 days.

(21) Appl. No.: 10/388,785

(22) Filed: Mar. 14, 2003

(51) Int. Cl.
   *G06F 15/16* (2006.01)
   *G06F 7/00* (2006.01)

(52) U.S. Cl. .................. 709/230; 709/229; 709/225; 709/217; 707/8; 707/10

(58) Field of Classification Search ............... 709/203, 709/217, 228, 230; 707/8, 10
See application file for complete search history.

(56) References Cited

U.S. PATENT DOCUMENTS

| | | | | |
|---|---|---|---|---|
| 4,897,781 A | * | 1/1990 | Chang et al. .......... 707/201 |
| 5,175,852 A | * | 12/1992 | Johnson et al. .......... 707/8 |
| 5,765,151 A | | 6/1998 | Senator .......... 707/8 |
| 5,832,512 A | | 11/1998 | Mastors et al. .......... 707/202 |
| 5,878,434 A | | 3/1999 | Draper et al. .......... 707/202 |
| 5,919,247 A | | 7/1999 | Van Hoff et al. .......... 709/217 |
| 5,937,406 A | * | 8/1999 | Balabine et al. .......... 707/100 |
| 5,991,771 A | | 11/1999 | Falls et al. .......... 707/202 |
| 6,061,731 A | * | 5/2000 | Blakeslee .......... 709/231 |
| 6,192,365 B1 | | 2/2001 | Draper et al. .......... 707/101 |
| 6,253,248 B1 | * | 6/2001 | Nakai et al. .......... 709/237 |
| 6,272,536 B1 | | 8/2001 | Van Hoff et al. .......... 709/217 |
| 6,330,605 B1 | * | 12/2001 | Christensen et al. .......... 709/226 |
| 6,374,336 B1 | | 4/2002 | Peters et al. .......... 711/167 |
| 6,415,373 B1 | | 7/2002 | Peters et al. .......... 711/167 |
| 6,665,705 B1 | * | 12/2003 | Daniels-Barnes et al. ... 709/203 |
| 6,792,461 B1 | * | 9/2004 | Hericourt .......... 709/225 |
| 7,058,763 B2 | * | 6/2006 | Gabber et al. .......... 711/118 |

OTHER PUBLICATIONS

Actona Technologies, "Actona Announces Availability of its Virtual File-system Network", Sept. 9, 2002, www.actona.com/News/PressRelease4.html.

Barbara Liskov, et al., "Replication in the Harp File System", In Proc. Of the 13th Symposium of Operating Systems Principles, pp. 226-238, Pacific Grove, California, USA, Oct. 1991.

* cited by examiner

*Primary Examiner*—Saleh Najjar
*Assistant Examiner*—Kevin T Bates
(74) *Attorney, Agent, or Firm*—Bainwood Huang

(57) ABSTRACT

A distributed network-attached storage network provides content distribution using conventional file transfer protocols such as NFS and CIFS. A filer proxy accepts a client request and translates the client request to a file transfer protocol accepted at the file system having the file requested in the client request. The filer proxy generates a file handle for the file containing redundant filer proxy information to be used for failover to a backup filer proxy in the event of a network error or failure of an original filer proxy. The file handle also contains information for network security purposes such as detection of forged file handles.

44 Claims, 9 Drawing Sheets

METHOD AND APPARATUS FOR TRANSPARENT DISTRIBUTED NETWORK-ATTACHED STORAGE WITH WEB CACHE COMMUNICATION PROTOCOL/ANYCAST AND FILE HANDLE REDUNDANCY

BACKGROUND OF THE INVENTION

A typical distributed file system is a client/server-based application that enables a client to access and process data stored on a server as if the data was local to the client. When the client accesses a file on the server, the server generally sends the client a copy of the file, which is cached on the client while the data is being processed and is then returned to the server. Ideally, a distributed file system organizes file and directory services of individual servers into a global directory in such a way that remote data access is not location-specific but is identical from any client.

A further development of the distributed file system for a Web-based environment is a content delivery network (CDN). In general, a CDN is a network of servers that delivers a Web page to a user based on the geographic locations of the user, the origin server of the Web page and local servers. Within the CDN, copies of the pages of a Web site are typically stored in local servers called content engines that are typically dispersed at geographically different locations, caching the contents of the Web page. Content routers in the CDN route user requests to an appropriate content engine. When a user requests a Web page that is part of a CDN, the CDN typically redirects the request from the originating site's server to a server in the CDN that is closest to the user and delivers the cached content from that closest server. The CDN also communicates with the originating server to deliver any content that has not been previously cached. This service is effective in speeding the delivery of content of Web sites with high traffic and Web sites that have global reach. Typically, the closer the content engine is to the user geographically, the faster the content will be delivered to the user. CDNs can also be configured to provide protection from large surges in traffic.

For some network applications, it is faster to have a server dedicated to file sharing accessible by file transfer protocols rather than Web transfer protocols. A typical network-attached storage (NAS) device is a server that is dedicated to file sharing rather than serving applications to clients. Generally, NAS does not provide any of the activities that a server in a server-centric system typically provides, such as e-mail, authentication or file management. Typically, an NAS device is attached to a local area network and is assigned its own network address. File requests are mapped by a main server to the NAS file server.

There are a number of file transfer protocols available for accessing files through a network. One such protocol is Network File System (NFS). NFS is a client/server application designed by Sun Microsystems that, in general, allows all network users to access shared files stored on computers of different types. NFS enables filesharing between computers as though the files were on a local hard drive. With NFS, computers connected to a network operate as clients while accessing remote files, and as servers while providing remote users access to local shared files. NFS is a stateless file-sharing protocol, which means that the file server can reboot nearly invisibly to its clients, except for the delay during the reboot. NFS, however, requires additional protocols to manage the technical details of such server application necessities as file and record locking and file system mounting and unmounting.

Another file transfer protocol is Common Internet File System (CIFS). CIFS defines a standard for remote file access. CIFS, like NFS, enables users with different types of computers to share files without having to install new software. CIFS and NFS are used by many applications, including Web browsers, to open and operate on files. Implementations of CIFS and NFS generally provide better support for file access control, file attributes, directory operations, file modifications, and random I/O access patterns in comparison to HTTP.

Flat file systems such as NFS, where all clients connect to the same server, often suffer from a bottleneck effect. Eventually a single server is unable to cope with the connected clients. Even with optimal client caching strategies the server must still deal with 8-12% of the original traffic, and, as the filesystem grows, this amount of traffic eventually overwhelms any server.

A solution to the bottleneck effect is to distribute load among several servers. Replicating all files at secondary servers, however, is expensive, and caching items at secondary servers as requests pass through them creates delays. When the load at a server becomes too high, the server stops serving the file directly and only sends out lists of other servers that it knows have cached the file. Clients attempt to first satisfy file requests from their own file caches, then from servers listed in a local name cache, and finally from the file's primary host. If a client receives a list of servers instead of the file, it caches that list in its name cache, and attempts to contact one of those servers instead.

In order to make data as accessible as possible using the robustness of long-established file transfer protocols, attempts were made to combine distributed file systems with the data replication available using CDNs. One system that attempts to combine distributed file systems and data replication is Alex, developed at Carnegie-Mellon University. Alex allows a remote file transfer protocol (FTP) server to be mapped into the local file system so that its files can be accessed using traditional file operations. This is accomplished through an Alex server that communicates with remote server sites through FTP, caches files locally, and communicates with the local file system through NFS. When the user wants to access a remote file, Alex downloads the file using FTP and then caches the file locally.

When another user needs the same file and tries to access it through the file system, it is not necessary to transfer the file from the original site again. The file will simply be taken out of Alex's cache rather than from the original site. This provides a savings in bandwidth and also provides a measure of reliability in the face of network failures. It also saves local disk space because users do not need to make personal copies of the files. Users use the files directly off of the Alex server.

Alex has a cache-consistency mechanism to support the cached data utility. Typically, the older a file is the less likely it is to be changed. Therefore, the older a file is, the less often Alex has to poll to insure that its local copy is up-to-date. To avoid excessive polling, Alex guarantees only that a file is never more than 10% out of date with its reported age. This is efficient, not only because FTP servers do not have to propagate file updates, but also because it avoids the necessity of modifying FTP servers to add more sophisticated invalidation techniques.

Another solution for providing data replication in distributed file systems is the Andrew File System (AFS). AFS was developed at Carnegie-Mellon University. AFS is a location-independent file system that uses a local cache on the client to reduce the workload and increase the performance of a distributed computing environment. The root of the AFS filetree is /afs. Under the root directory, there are directories that correspond to AFS cells. The cells may be local (on same LAN) or remote (e.g. halfway around the world). An AFS cell is a collection of servers grouped together administratively and presenting a single, cohesive filesystem. Typically, an AFS cell is a set of hosts that use the same Internet domain name.

AFS has local caching on the client machine. AFS client machines run a Cache Manager process. The Cache Manager maintains information about the identities of the users logged into the machine, finds and requests data on their behalf, and keeps chunks of retrieved files on local disk. As soon as a remote file is accessed, a chunk of that file is copied to local disk and therefore subsequent accesses (warm reads) are almost as fast as reading the entire file from local disk and considerably faster than a cold read (reading across the network). Local caching also significantly reduces the amount of network traffic, improving performance when a cold read is necessary.

Unlike NFS, which makes use of /etc/filesystems (on a client) to map (mount) between a local directory name and a remote filesystem, AFS does its mapping (filename to location) at the server. This has the advantage of making the served filespace location independent. Location independence means that a user does not need to know which fileserver holds the file. Instead, the user only needs to know the pathname of a file and the name of the AFS cell.

Other conventional solutions to distributed network storage systems include block-channel technologies such as storage area network (SAN) and Fibre Channel. SAN is a high-speed special-purpose network that interconnects different kinds of data storage devices with associated data servers. Fibre Channel is a computer communications protocol directed toward connecting computer servers to shared storage devices and for interconnecting storage controllers and storage drives. Fibre Channel combines channel technologies and network technologies. A channel is a closed, direct and structured mechanism for transmitting data between relatively few entities. Channels are typically used to connect peripheral devices such as a disk drive or a printer to a workstation. Fibre Channel provides a layered protocol structure that can be used to connect systems and storage in point-to-point or switched topologies. Some SAN networks incorporate Fibre Channel.

Other conventional distributed storage technologies include custom filesystem drivers for handling storage transactions and for handling the associated metadata to accomplish the storage transactions.

Further conventional solutions to distributed storage networks includes local-cluster redundancy systems where many NAS devices share a network address and use failover methods such as the primary copy replication technique. In primary copy replication, client calls are directed to a primary server among the NAS devices and the primary server communicates the call to the backup servers. After the backup servers acknowledge the communication, the primary server commits to the transaction requested in the client call. When a failure or a recovery occurs, all the servers in the system are reorganized.

SUMMARY OF THE INVENTION

In general, conventional distributed file system technology does not provide the content distribution of web-based CDNs with the advantages of using file transfer protocols. File transfer protocols typically have better file access control, file attributes, directory operations, and file modification utility than web transfer protocols. Prior systems attempting to combine distributed file systems with data replication such as Alex do not have sufficient access and replication transparency. A unified directory system such as AFS does not provide distributed content. The caching in AFS is done on the client and not on local servers as in content delivery networks. In short, prior art file systems were not designed to provide proxies over weakly connected networks. None of the prior art systems are able to calculate differences and transfer differences over the weakly connected network. Also, none of the conventional solutions to distributed storage networks enable clients to make requests using the NFS or CIFS protocols transparently nor are the conventional systems backward compatible in configuration for mounting NFS or CIFS volumes. It remains desirable to have a method and apparatus capable of file transfer using common file transfer protocols, such as NFS and CIFS, and having the distributed content of content delivery networks with the capability of maintaining cached data.

Embodiments of the present invention significantly overcome such deficiencies and provide mechanisms and techniques for a transparent distributed network-attached storage (D-NAS) network. A D-NAS network combines a distributed filesystem and content distribution with NAS. In the present invention, NAS storage is made available to clients in a large, distributed network. The D-NAS network stores a master copy of the files and associated metadata in one or more large and scaleable central filer system, called the master filer proxy. The master filer proxy manages the access and distribution of files in the network. Clients may access the files using standard file transfer protocols such as NFS and CIFS. Filer proxies are used to distribute data access. Clients located remotely communicate with local filer proxies that maintain synchronization with the master filer proxy.

The filer proxies in the D-NAS network efficiently route client requests, handle a variety of file transfer protocols, and provide backward-compatible distributed network-attached storage read and write capability. Each filer proxy maintains a table of filesystems assigned to the filer proxy with associated file protocols. This enables the filer proxy to mount both NFS and CIFS file volumes, for example, and further, the filer proxy is configurable to mount filesystems using other file protocols. Since more than one client in a distributed NAS system may access the same data simultaneously, the D-NAS system has a mechanism in place (such as maintaining information about the times of access) to organize updates so that the client always receives the most current version of data and that data conflicts do not arise. The filer proxy further provides a locking mechanism to put a lock on a file being accessed by a client.

The filer proxy has the capability of operating natively with various file transfer protocols. A client may make a request in a file transfer protocol such as NFS or CIFS. The request contains at least a portion of a file pathname. An example NFS request is "Lookup ('usr')". An example CIFS request is "Attach ('\other')". The present invention enables both of these protocols to be handled by the filer proxy. Anycast (or alternatively, WCCP local capture) is implemented for a UDP-based filing protocol such as NFS v2, thereby enabling transparency for the D-NAS network of the present invention. Also, NFS-issued file handles in the present invention are consistent in i-node and generation number across the filer proxies. Further, the file handles have a proxy identification number that enables filer proxies to mask incoherence from a client that migrates, inadvertently or purposefully, from one filer proxy to another.

The client in the D-NAS network is configured with a number of mount points and associated IP addresses for data in the network. The client, however, when it moves to different parts of the network (as in, for example, a laptop) is able to access the mount points from anywhere inside the D-NAS network. Using the present invention, the client is configured with mount points and IP addresses from a distinct subnet used for routing to filer proxies. The same IP addresses to the same mount points are used throughout the network. That means that a user can take a laptop around a company and still have access.

Each filer proxy is configured with a table of IP addresses of the mount points that it supports. There is overlapping support among filer proxies for some mount points. The overlapping support for mount points provides redundancy for those mount points.

In operation, the client transmits a request. The request is routed by the router to the filer proxy supporting that mount point. The filer proxy-supported IP addresses are defined most efficiently in an anycast mode. The filer proxy supports a range of addresses such as 10.100.100.[1-200]. The router treats the range as a single address and in so doing creates many additional routing entries. The IP address is used to communicate to the appropriate filer proxy. The filer proxy looks up the IP address and the associated file protocol in its table. The filer proxy transmits the request to the IP address in the table. The IP address points to a mount point/filesystem on the master filer proxy. Generally there is one filesystem per mount point.

More specifically, embodiments of the invention provide a method for a filer proxy. One such method embodiment comprises the step of providing a path through a computer network to a first filer proxy where the path is directed to a filesystem attached to the computer network. The filesystem has a network address. The first filer proxy receives a client request for a file in the filesystem and the request includes the filesystem network address. The filer proxy then determines from the network address in the client request an accepted file transfer protocol, such as NFS or CIFS for the system at the network address. The filer proxy then forwards the client request to the network address in the accepted file transfer protocol. In this way, a distributed network is implemented where filesystems are accessible using conventional file transfer protocols.

In another embodiment of the invention, the step of providing a path further comprises the step of advertising to a router in the network that filer proxy is a low-cost route to the network address. In another embodiment of the invention the step of providing a path further comprises instructing the router using Web Cache Communication Protocol (WCCP) to forward requests for the network address to the filer proxy. A further embodiment of the WCCP embodiment includes a service group of routers. The filer proxy notifies the service group of its configuration and receives from the routers a list of filer proxy addresses configured in the service group. The filer proxy then provides a policy for redirecting packets. In another embodiment of the invention, the step of providing a path further comprises providing an anycast address to a range of network addresses. In another embodiment, the anycast address is for a partition group connected to the computer network. In these ways, the router is directed to send certain data items to the filer proxy in order to access the distributed data.

In another embodiment of the invention, the filesystem is part of a network-attached storage system. A network-attached storage system provides a large data storage space with a storage-dedicated server and therefore provides faster data access.

In another embodiment of the invention, the step of determining an accepted file transfer protocol involves looking up the accepted file transfer protocol in a table of network addresses and associated file transfer protocols. In another embodiment of the invention, the filer proxy also determines a file transfer protocol of the client request and a requester identity. In this way, the filer proxy determines which file transfer protocol should be used for the forwarded client request.

In another embodiment of the invention, the filer proxy creates a file handle for the open file opened in response to the client request. The file request includes the client file transfer protocol and the client, or requester, identity. The file handle encapsulates useful proxy and error handling information.

In a further alternative embodiment of the invention, the filer proxy determines whether a received client request should be acted on by the receiving filer proxy or whether it should be forwarded to another filer proxy. The receiving filer proxy forwards a client request to another filer proxy if the receiving filer proxy does not find the network address from the client request in its table of network addresses and associated accepted file transfer protocols. In this way, the filer proxy determines whether a client request can be more efficiently handled by another filer proxy and also overcome errors where the filer proxy has incorrectly received a client request.

In another embodiment of the invention, the filer proxy creates a file handle for the file opened as a result of acting on the client request. The filer proxy maintains a table of file handles and an associated connection state. The filer proxy forwards the file handle to the client for use in subsequent transactions on the opened file. There are several alternative embodiments to this invention including receiving a file handle generated by the master filer proxy alone, generating a file handle in conjunction with the master filer proxy and also generating the file handle in the filer proxy alone. In another embodiment of the invention, the filer proxies in the network are configured to be similar and therefore, a first filer proxy generates a file handle similar to a file handle generated by any other filer proxy in the network when provided with similar data.

In another embodiment of the invention, the filer proxy requests data from the master filer proxy for generating a file handle. In a first arrangement, the data is error handling information. In a second arrangement, the data is file lock information. In this way, the filer proxy can generate a file handle that is useful in the filer proxy failover processes.

The file handle is an identification number for the file after it is opened. The various arrangements of the invention also contain elements from the following list in various combinations as will be described below: mount point of the file or i-node of the file, file generation count, a verifying code, a filer proxy identification number, a second filer proxy identification number, a client identification number, a hash count, and a master generation number. The file handle contains useful information for file proxying as well as the file identification number.

In another embodiment of the invention, the filer proxy holds file locks on open files to prevent clients other than a current client from writing to an open file. In an alternative embodiment of the invention, the master filer proxy holds the file locks. In this way, the proxy system prevents clients other than a current client from writing into an open file.

In another embodiment of the invention, the filer proxy synchronizes the files that it is proxying with the files in the filesystems managed by the master filer proxy. In order to successfully implement a distributed network-attached storage system, the files handled by the filer proxies need to be synchronized with the master filesystems.

There are several alternative embodiments for handling filer proxy failover when a second filer proxy receives a client request having a file handle generated through a first filer proxy. If the first filer proxy is still active, in a first alternative embodiment, the second filer proxy forwards the client request across the network, for example, over a tunnel, to the first filer proxy. In a second alternative embodiment if the first filer proxy is still active, the second filer proxy requests information from the first filer proxy in order to act on the client request. The information is typically file lock and file differences information. In this way, the failover process overcomes network errors. If the first filer proxy is operable, in a third alternative embodiment of the failover process, the second filer proxy acts on the client request using information from the file handle contained in the client request. In a fourth alternative embodiment where the first filer proxy is inoperable, the second filer proxy requests file lock information from the master filer proxy. In these ways, the second filer proxy is able to act on a client request in the instances where the first filer proxy has failed and become inoperable.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

A distributed network-attached storage (D-NAS) network combines a distributed filesystem and content distribution with NAS. The distributed network-attached storage (D-NAS) network stores a master copy of the files and associated metadata in at least one large and scaleable central NAS system, called the master filer proxy. The master filer proxy manages the access and distribution of files in the network. Clients may access the files using standard file transfer protocols such as NFS and CIFS. Filer proxies are used to distribute data access. Clients located remotely communicate with local filer proxies that maintain synchronization with the master filer proxy. Additional information encoded into file handles enables failovers from one filer proxy to another transparently to a client.

Figure 1:
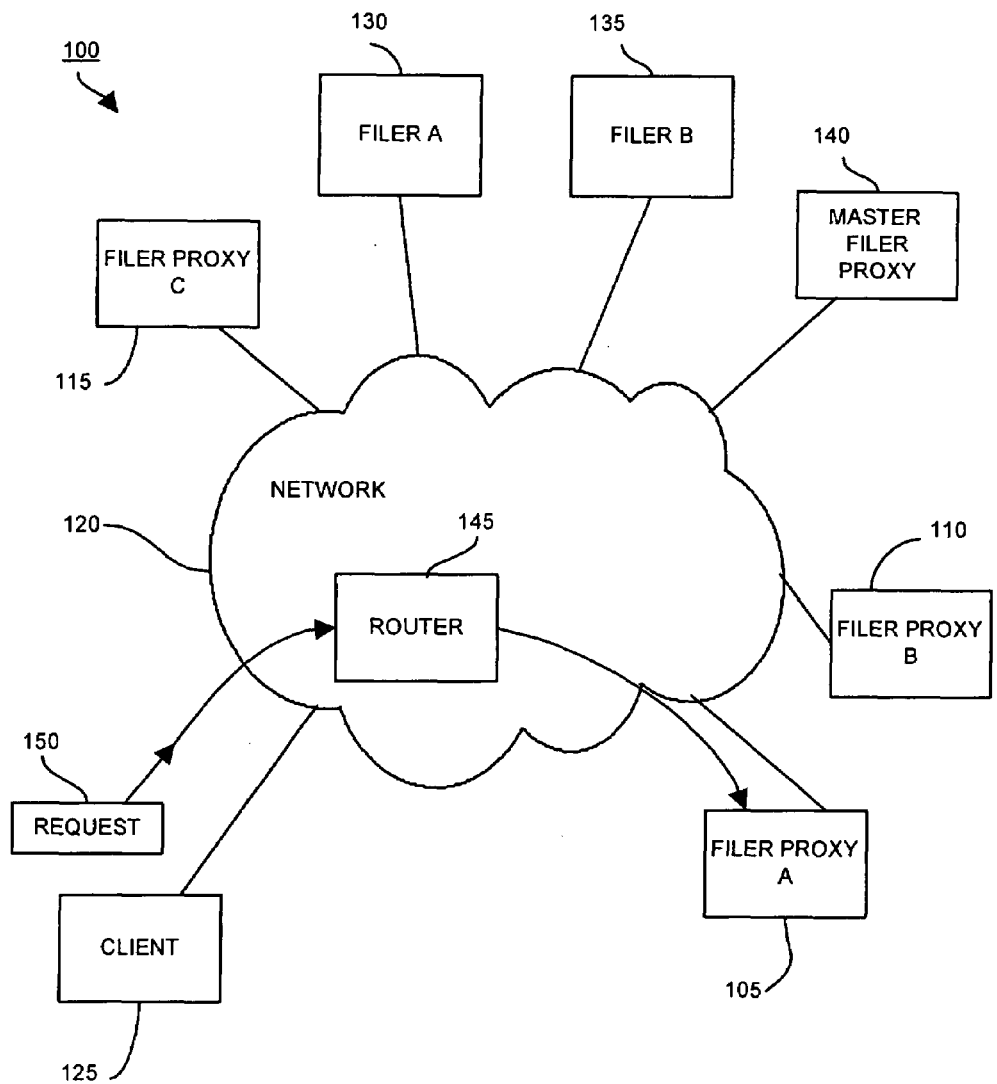
FIG. 1 is a block diagram of a distributed network-attached storage computer network environment according to principles of the invention.

FIG. 1 is a block diagram of a distributed network-attached storage (D-NAS) network environment 100 according to principles of the present invention. A plurality of filer proxies, Filer Proxy A 105, Filer Proxy B 110, Filer Proxy C 115 and a master filer proxy 140 are connected to a network 120. A first storage system Filer A 130 and a second storage system, Filer B 135, are connected to the network 120. Filer A 130 and Filer B 135 are, for example, network-attached storage systems. A client system 125 is also connected to the network 120. In addition, the network 120 includes a router 145.

In the D-NAS network environment 100, the filer proxies 105, 110, 115 cache data from the Filers 130, 135 in order to distribute load in the network environment 100. Each filer 135, 140 has at least one filesystem which will be described below. The master filer proxy 140 controls the data management and data access to the filer proxies 105, 110, 115.

Each filer proxy 105, 110, 115 handles a plurality of filesystems connected to the network through the filers 130, 135. In some cases, a filesystem is accessible via more than one filer proxy. For each filesystem that a filer proxy 105, 110, 115 handles, the filer proxy 105, 110, 115 peers with the router 145. One method of peering with a router is the method of advertising in which the filer proxy 105, 110, 115 notifies the router 145 that it is a low-cost path to a particular network address. In a first embodiment of the invention, the filer proxy, for example, filer proxy A 105, advertises to the router 145 that it is a low-cost path to a particular filesystem. When the router 145 later receives a client request 150 addressed to the particular filesystem, the router 145 routes the client request 150 to a filer proxy such as filer proxy A 105. The advertising method of peering with the router has the advantage that if a filer proxy becomes inoperable or malfunctions, the client request can be re-routed because the router 145 has other routing options. For the purpose of clarity, the illustrated network has only one router. Typically, a D-NAS network would have a plurality of routers.

In a second embodiment of the invention, the filer proxy, for example filer proxy A 105, instructs the router 145, using Web Cache Communication Protocol (WCCP), to forward requests for a particular filesystem to the filer proxy A 105. WCCP, developed by Cisco Systems, of San Jose, Calif., specifies interactions between one or more routers (or Layer 3 switches) and one or more web-caches. The purpose of the router-cache interaction is to establish and maintain the transparent redirection of selected types of traffic flowing through a group of routers. The selected traffic is redirected to a group of web-caches with the aim of optimizing resource usage and lowering response times. In the present embodiment of the invention, after being instructed to forward client requests for the particular filesystem to filer proxy A, the router 145, after receiving a client request 150 for the particular filesystem, forwards the client request 150 to filer proxy A 105.

WCCP v2 has a keepalive mechanism that enables traffic to be diverted if a filer proxy becomes disabled. WCCP v2 has a multicast address strategy in which the filer proxy sends notification to one address which provides coverage for a plurality of routers in a service group. For example, 224.0.0.0 indicates packets to be sent to a multicast address of 224.0.0.0 and would send a multicast packet to all routers in the service group. In this implementation, a number of filer proxies are grouped into a cluster. Each filer proxy in the cluster obtains a list of routers and stores the list in its memory instead of having one central "home router." Each filer proxy announces its presence and view of the service group to the list of router IP addresses with which the filer proxies have been configured. The routers reply with their view or a list of filer proxy addresses in the group. Once the view is consistent across all filer proxies in the cluster, one filer proxy is designated as the lead and sets the policy that all the routers need to deploy in redirecting packets. Routers are configured with an IP multicast address for the service group.

After filer proxy A 105 receives the client request 150, filer proxy A 105 connects to the filer 130, 135 having the requested filesystem, as will be described below, and caches the file requested in the client request 150. Filer proxy A 105 also puts a lock on the requested file, as will be described below, through the master filer proxy 140 so that other clients will not be able to write into the file while the file is in use by the current requesting client 125.

Figure 2:
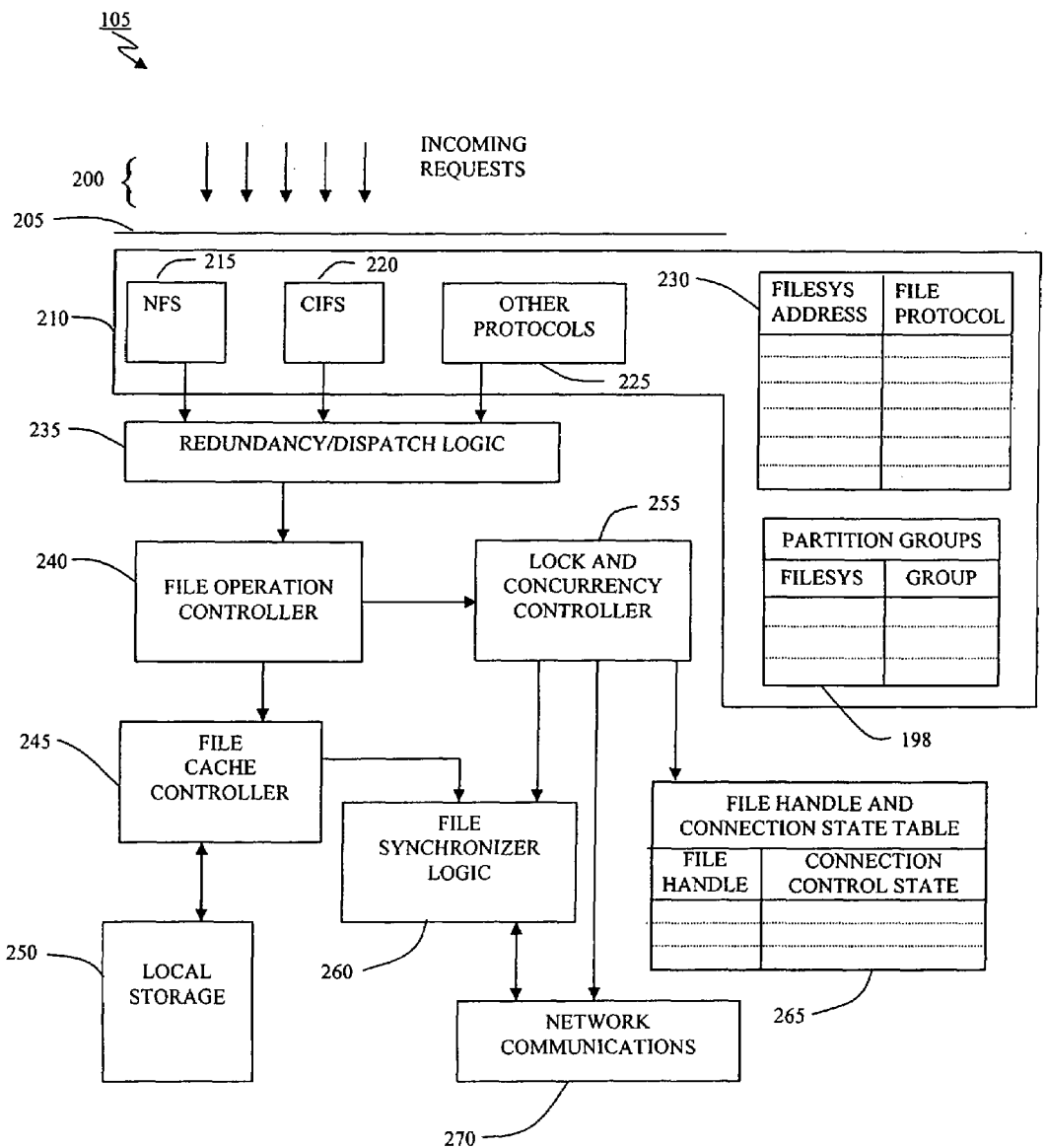
FIG. 2 is a block diagram of a filer proxy of FIG. 1.

FIG. 2 is a block diagram of a filer proxy, for example, filer proxy A 105 of FIG. 1. Incoming client requests 200 arrive at a first network communications interface 205 of filer proxy A 105. A protocol stack 210 behind the first network communications interface 205 includes an NFS module 215, a CIFS module 220 and also a module for other protocol standards 225. The protocol stack 210 further includes a table of network addresses 230. In a first embodiment of the invention, the table of network addresses 230 has IP addresses and associated file transfer protocols used to access filesystems. In a second embodiment, the table of network addresses 230 has mount points and associated file transfer protocols. In one embodiment of the invention, the protocol stack 210 further includes a table of partition groups 198 storing information about partition groups and associated filesystems. Partition groups will be explained in more detail below with regard to FIG. 5. The protocol stack 210 is connected to redundancy/dispatch logic 235. A file operation controller 240 is also connected to the redundancy/dispatch logic 235. The file operation controller 240 is further connected to a file cache controller 245 that, in turn, is connected to local storage 250. The file operation controller 240 is also connected to a lock and concurrency controller 255 that is connected to a file synchronizer logic module 260, a file handle and connection state table 265 and a second network communications interface 270. In an alternative embodiment of the invention, the first and second network communications interfaces 200, 270 are combined in a single interface.

As stated above, filer proxy A 105 receives client requests at the first network communications interface 205. Each client request is passed through the first network interface 205 to the protocol stack 210. The protocol stack 210 analyzes the client request 200 to determine the file transfer protocol of the client request 200, the IP address or the mount point requested, the identity of the requestor and the file object requested. The NFS module 215 handles NFS operations. That is, the NFS module accepts incoming clients requests that are in NFS format. The NFS module 215 also translates client requests or other messages to NFS format. The CIFS module 220 does the equivalent operations of the NFS module 215 in the CIFS protocol. The other protocols module 225 handles the equivalent operations of the NFS module 215 for other protocols. From the mount point requested and the table of protocols 230, the protocol stack 210 determines the file transfer protocol to use in operating on the requested file object.

After the protocol stack 210 determines the file transfer protocol, the redundancy/dispatch logic module 235 determines if the request 200 should be handled in this particular filer proxy 105. The redundancy/dispatch module 235 acts as a virtualization shim for all filer proxies in the D-NAS network and makes the decision based on IP address or file handle (to be described below) to determine whether the request should be handled in this filer proxy 105.

If the redundancy/dispatch module 235 determines that this filer proxy 105 should handle the client request 200, then the file operation controller 240 operates on the requested file. In a first embodiment, the requested file is fetched from the appropriate server using the file transfer protocols determined from the table of IP addresses and protocols 230. The file is cached locally in local storage 250 and operations on the file go through the file cache controller 245. In a second embodiment of the invention, the file is cached at the master filer proxy 140 and the file operation controller 240 together with the file cache controller 245 operate on the file.

The file synchronizer logic 260 determines that changes have been made to a specified file or set of files, determine if one or both copies of a file have been modified since the last synchronization and replace each older file with the newer changed file, or presents options to resolve conflicting changes to the files.

A locking system is used to maintain the integrity of the accessed files because shared files in a network are generally accessible by more than one client. The lock and concurrency controller 255 holds locks on files for concurrent use of the file. When a client explicitly requests a file lock or implicitly requests a lock by writing on a file, the concurrency controller 255 is told by the file operation controller 240 that the file is being written to. A file lock request is sent through the second network communications interface 270 to the master filer proxy 140 to hold a lock on the file. If the file is operated on directly on the master filer proxy 140, the client holds the lock. Locking schemes for holding file locks are well known in the art.

If locks are held, or if there is a pending file state, the file state, in association with a file handle, is recorded into the file handle table 265. The lock is held in the master filer proxy 140 by a filer proxy acting on behalf of the client. If the initial filer proxy dies, the lock is floated by the master filer proxy 140 to another filer proxy.

Figure 3:
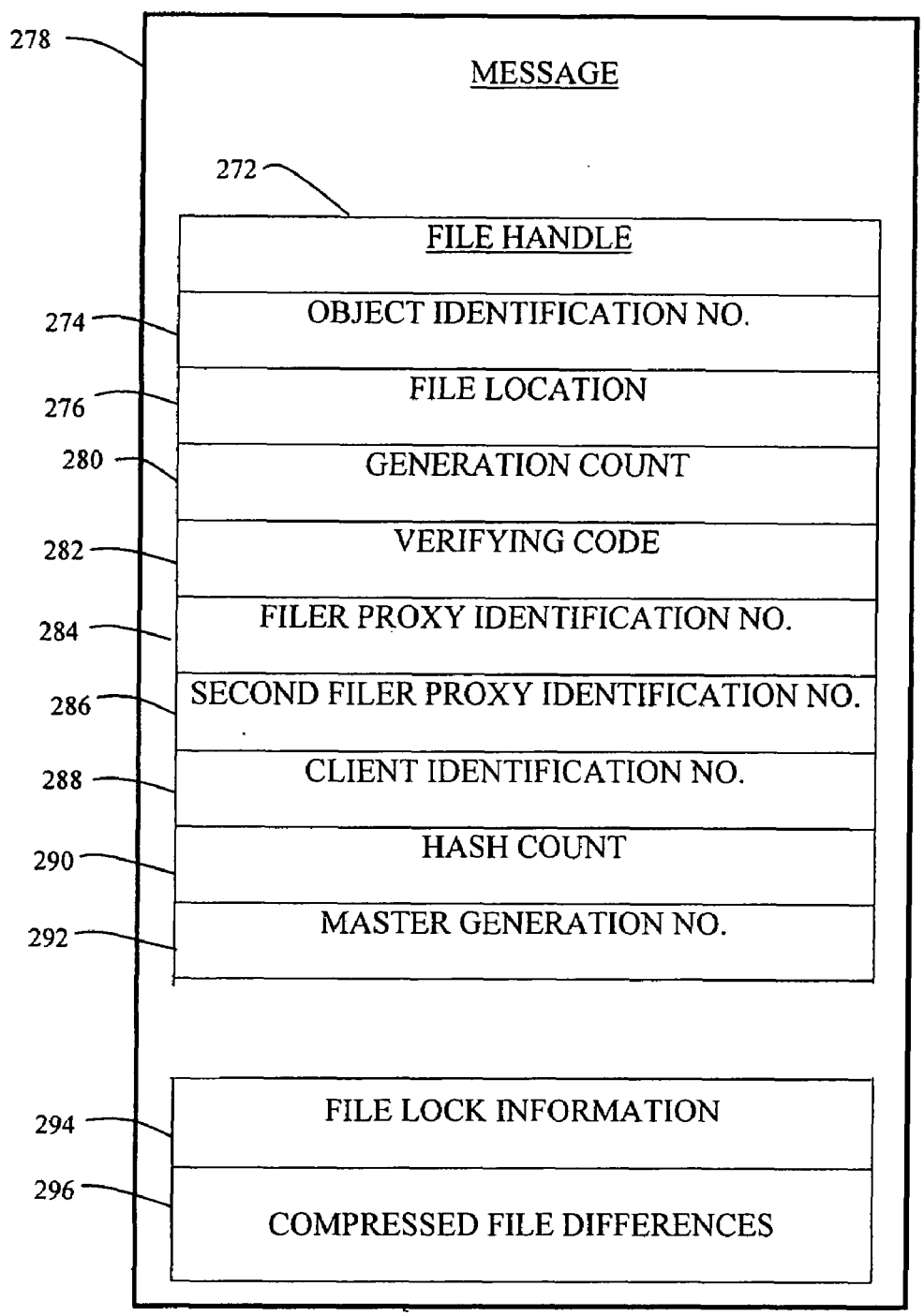
FIG. 3 is a block diagram of a message including a file handle according to principles of the invention.

FIG. 3 is a block diagram of a message 278 including a file handle 272 according to principles of the invention. The message 278 is an example message used by the filer proxies to communicate the file handle 272 and associated information to other filer proxies or to other network devices. The file handle 272, at a minimum, has an identification number temporarily assigned to a file when the file is opened. The number is used to identify the file for a particular session. This number is the object identification number 274. File handle issuance and management is part of successful fault tolerance and content handling in the D-NAS network environment 100. The file handles 272 in the D-NAS network 100 contain additional information useful for managing data in a proxy system. For this purpose, it is useful to know the network location of a file. The file location field 276 contains in one embodiment the mount point of the file and in an alternative embodiment the i-node of the file. The file handle 272 includes a filer proxy identification number field 284 so that the filer proxy handling the session can be identified. The filer proxy identification number is one factor used by the redundancy/dispatch logic module 235 of the filer proxy 105 to determine whether or not a client request should be operated on or forwarded to another filer proxy. A second filer proxy identification number field 286 is also included so that the client request having the file handle 272 can be forwarded to a second filer proxy in the event that the first filer proxy fails. One or more of the following fields, a file generation count 280, master filer proxy file generation count 292, verifying code 282, client identification number 288, and hash count 290 are provided for file handle verification purposes. The client identification number and hash count also provide security from, for example, forged file handles.

Other configurations of the file handle 272 are possible within the scope of the invention. In alternative embodiments of the invention, the file handle does not have all the fields shown in FIG. 3. More fields for additional data about the open file, the filesystem, network, client and so on are possible. In further alternative embodiments, various combinations of fields are possible.

File lock information 294 and compressed file differences 296 are included in the message 278 in order to maintain a file session with a client in the event that the first filer proxy fails. The second, backup, filer proxy receiving the file handle with file lock information can assume the proxy for the file. Further the compressed file differences 296 complete the information needed for the second filer proxy to take over proxying the file without transparently to the client.

The file handle 272 is generated when a file is opened. In one embodiment of the invention, the master filer proxy 140 generates the file handle 272. In one embodiment, the master filer proxy 140 generates a file handle including an object identification number 274, a mount point 276 (or i-node 278) and a file generation count 280. In an alternative embodiment of the invention, the master filer proxy 140 is filer proxy-aware. In that embodiment, the filer proxy 105 and the master filer proxy 140 together generate a file handle 272. In another alternative embodiment of the invention, the filer proxy 105 generates the file handle 272. In another alternative embodiment of the invention, all filer proxies are configured similarly so that the filer proxies generate similar file handles. Therefore, when the filer proxies are given a particular set of inputs, one filer proxy in the network should generate the same file handle as any other filer proxy in the network. In particular, NFS-issued file handles need consistent i-node and generation numbers across filer proxies, however each file handle also contains the particular filer proxy identification number of the generating filer proxy. The advantage of this common generation of file handles is that file handles continue to operate across system reboots and assignments to different filer proxies.

The file handle 272, once created, is forwarded to the client 125 to be used by the client 125 in subsequent operations on the open file.

Figure 4:
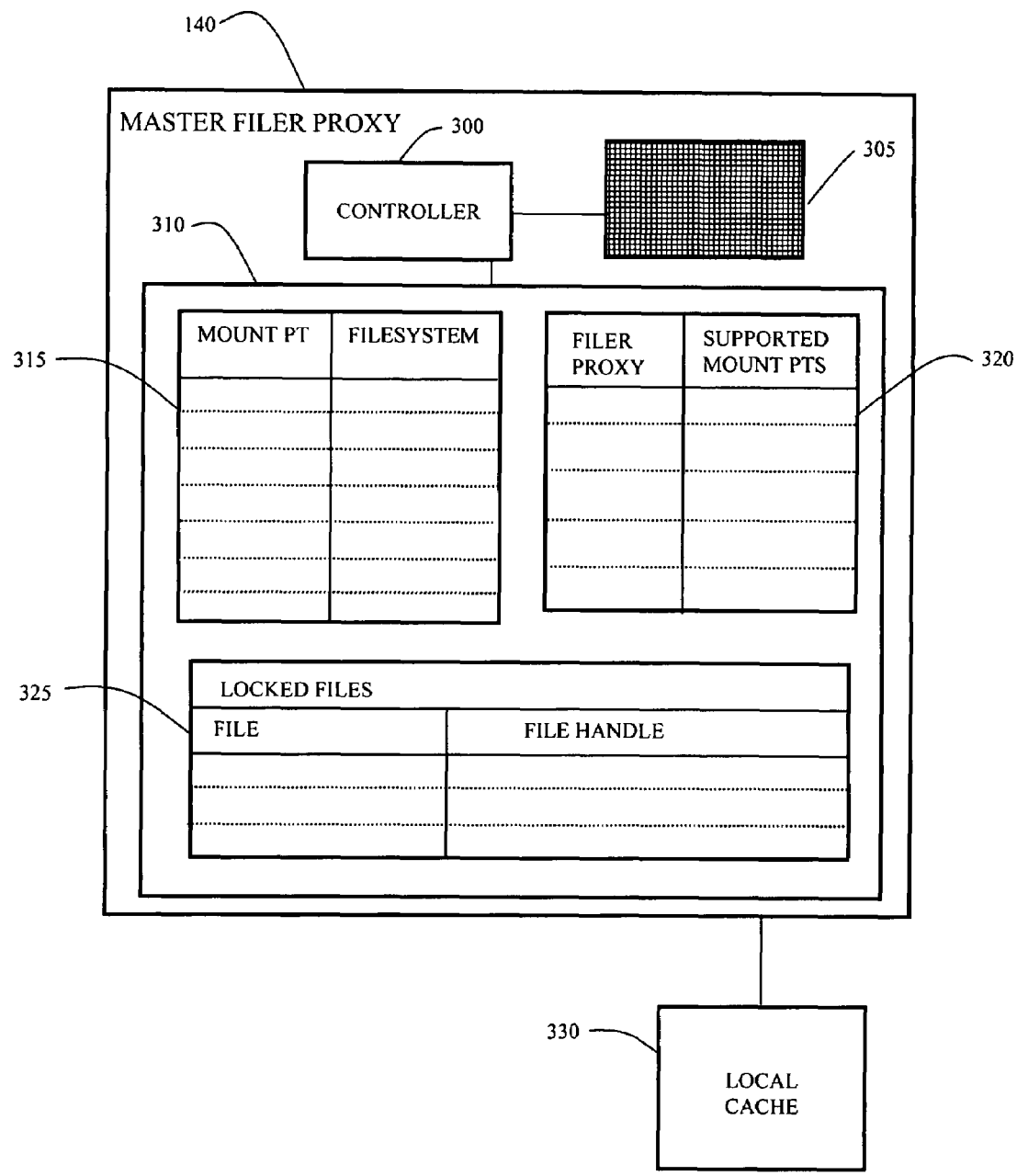
FIG. 4 is a block diagram of the master filer proxy of FIG. 1.

FIG. 4 shows the master filer proxy 140. The master filer proxy 140 controls data management and data access to the filer proxies 105, 110, 115. The master filer proxy 140 has a controller 300 and a memory 305 to execute master file operations. The master filer proxy 140 has a local storage area 310 to store tables of operation. A table of mount points and associated filesystems 315 is used by the master filer proxy 140 to access filesystems in response to the client request 150. A table of filer proxies and supported mount points 320 is used by the master filer proxy 140 to manage the filer proxies 105, 110, 115. In one alternative embodiment of the invention, a table of files and file handles of locked files 325 is used by the master filer proxy 140 to maintain file locks. In another embodiment of the invention, the master filer proxy 140 has a local cache 330 for caching open files.

Figure 5:
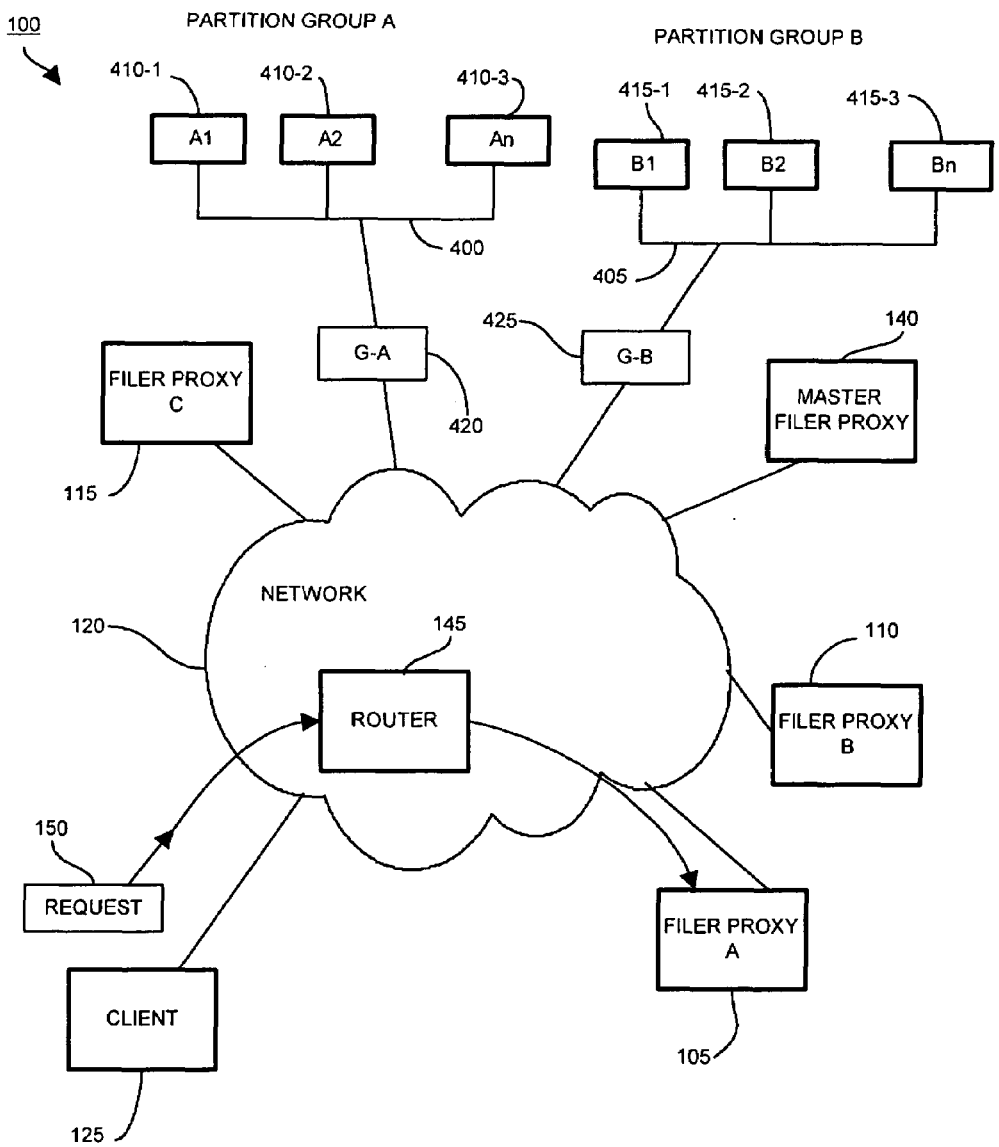
FIG. 5 is a block diagram of the distributed network-attached storage computer network of FIG. 1 having filesystems in arranged in partition groups.

FIG. 5 is a block diagram of the distributed network-attached storage (D-NAS) network environment 100 of FIG. 1 having partition groups. The plurality of filer proxies, Filer Proxy A 105, Filer Proxy B 110, Filer Proxy C 115 and the master filer proxy 140 are connected to the network 120. The network 120 includes a router 145. Filesystems attached to the network are configured into partitions in the master filer proxy 140 and are, in this embodiment, grouped into two partition groups, partition group A 400 and partition group B 405. It should be understood that the partition groups are defined in the table in the master filer proxy 140 shown in FIG. 2 and are not physical aggregations. The partition groups are illustrated and referred to in this discussion as physical entities for the sake of ease of explanation. Partition group A 400 has a plurality of partitions 410 and partition group B also has a plurality of partitions 415. Typically, each partition is a filesystem.

The partition groups conserve IP addresses in the network. (P+2) IP addresses are assigned to the partition groups A 400, and B 405 and to the master filer proxy 140 where P represents the number of partition groups. The two additional IP addresses are primary and backup IP addresses for the master filer proxy 140. All partitions P1 . . . Pk in a partition group share one assigned IP address. Accordingly, the partitions in Partition Group A 400 share a first shared IP address G-A 420. The partitions in Partition Group B 405 share a second shared IP address G-B 425. The additional two IP addresses are the primary and backup IP address for the master node controlling file handle coordination services such as namespace allocations among the filer proxies for NFS and assignments of unique ID values for CIFS operations. In this embodiment of the invention, the master filer proxy 140 performs these tasks. The router 145 delivers mount operation requests and NFS requests (assuming UDP) to an active filer proxy supporting the requested partition group, based on IP routing metrics computed for the partition group addresses G-A 420, and G-B 425.

In a first embodiment of partition groups, the addresses for the partitions 410, 415 are used as anycast IP addresses. In Internet Protocol version 6 (IPv6), anycast is communication between a single sender and the nearest of several receivers in a group. the term exists in contradistinction to multicast, communication between a single sender and multiple receivers, and unicast, communication between a single sender and a single receiver in a network. Anycasting is designed to let one host initiate the efficient updating of router tables for a group of hosts. IPv6 can determine which gateway host is closest and sends the packets to that host as though it were a unicast communication. In turn, that host can anycast to another host in the group until all routing tables are updated. Each of the filer proxies, such as Filer Proxy A 105, that is actively proxying for partition A1 410-1 for example, attaches address G-A 420 to at least one of its network interfaces. Filer Proxy A 105 or the router 145 is configured to publish the availability of G-A 420 at this location into a layer-3 routing system in use across the network 120.

In a second alternative embodiment of partition groups, the primary IP address of G-A 420, for example, for a partition group such as Partition Group A 400 is used as a label to enable WCCP configurations at participating sites to segregate NFS (or CIFS) requests from normal traffic flows and deliver them to a nearby filer proxy that is actively proxying a corresponding partition such as partition A1 410-1.

In a third alternative embodiment of partition groups, the client 125 uses a backward-compatible NFS configuration where the client mounts all partitions from a partition group such as Partition Group A 400 from a single imaginary virtual server host, having a published IP address G-A 420.

Figure 6:
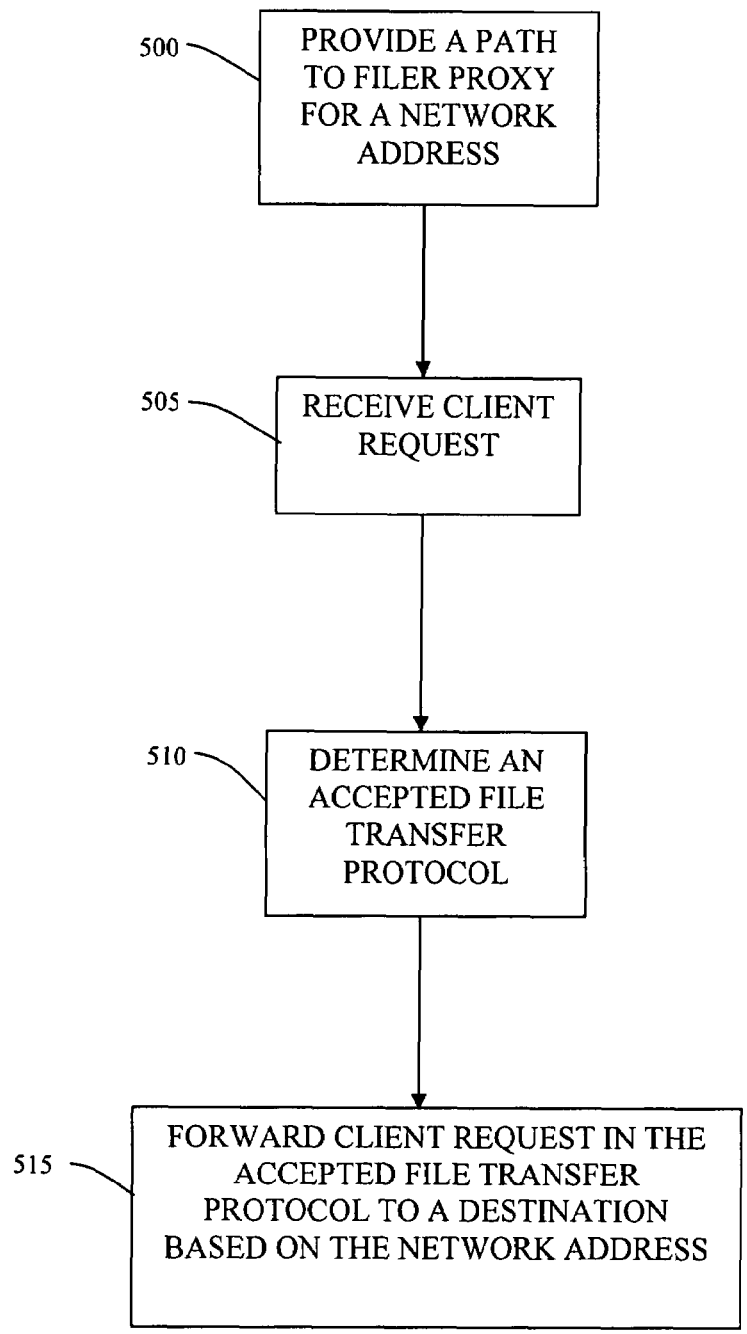
FIG. 6 is a high-level chart of the operation of the filer proxy of FIG. 1.

FIG. 6 is a flow chart of the basic operation of the filer proxy system. At step 500, the filer proxy, for example filer proxy A 105, provides a path or route to a filesystem 410, 415 (or a partition group) in a filer 130, 135. As described above, a first method of accomplishing this is by peering with one or more routers in the network 120. A second method is for the filer proxy 105 to instruct, using WCCP, the local router 145 to forward client requests 150 for the particular filesystem to the filer proxy 105. The filer proxy, in the WCCP embodiment, sends notification to a service group address that provides information to all routers in the service group. The notification includes router configuration of the routers in the service group and also filer proxy configuration of the filer proxies in the network. In one embodiment of the invention, the path is an anycast address to a range of network addresses. A client request having a network address within the range is directed by the router to the filer proxy servicing that range of network addresses. In another embodiment, the anycast address is an address of a partition group 400, 405.

At step 505, the filer proxy 105 receives the client request 150 for a file object in the filesystem 410, 415 from the client 125. There are many types of requests made by clients to filesystems. For example, the types of client requests include administrative, metat-data-read, meta-data-write, read and write requests. The client request, if it is a first request in a session, has a network address or a mount point. In subsequent client requests in the session, the client request contains a file handle generated after opening the requested file in the first client request.

At step 510, the filer proxy determines an accepted file transfer protocol for the network address. The filer proxy looks up the filesystem address in its table of network addresses to find the appropriate file transfer protocol to use to access that filesystem. In a first embodiment, the table has network addresses and in a second embodiment, the table has mount points. In another embodiment of the invention, the filer proxy also determines the file transfer protocol of the client request and the requester identity. File transfer protocol of the client request can be useful to increase efficiency in the filer proxy since a client request in the same protocol as the requested filesystem does not need to be translated. The requestor identity information can be added to the file handle generated from the client request for both failover and security purposes.

At step 515, the filer proxy forwards the client request to a destination based on the network address and the determined file transfer protocol found in the table of network addresses. The destination in one embodiment is the filer proxy itself. In determining the destination in this embodiment, the filer proxy discovers that the requested file is in its local storage 250. In this case, the filer proxy acts on the client request locally and does not forward the request to the filers. In another embodiment of the invention, the filer proxy forwards the client request to one of the filers based on the network address and file transfer protocol and information from the master filer proxy. When the requested file is opened, the filer proxy forwards a file handle for the open file to the client.

Figure 7:
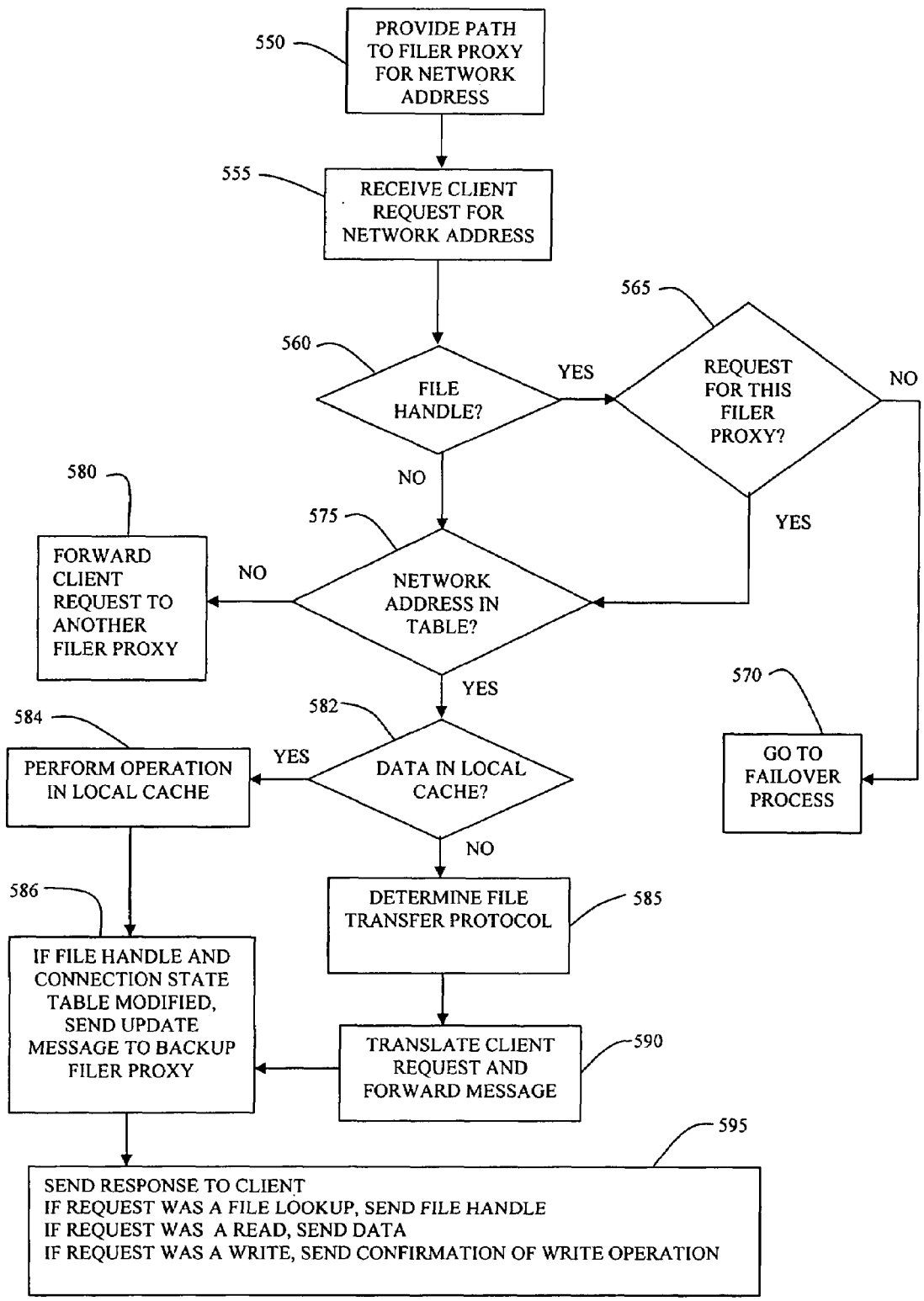
FIG. 7 is a detailed flow chart of the operation of the filer proxy of FIG. 1.

FIG. 7 is a detailed flow chart of the operation of the filer proxy 105 according to principles of the invention. At step 550, the filer proxy provides a path for a network address to a router as described above with regard to FIG. 6. At step 555, the filer proxy receives a client request 150 from the client 125 for the network address.

At step 560, the filer proxy examines the client request 150 to find a file handle 272. A first request in a session will not have a file handle 272. If the filer proxy finds a file handle, the filer proxy moves to step 565. If the filer proxy does not find a file handle, the filer proxy moves to step 575.

At step 565, the filer proxy has found a file handle in the client request and determines from information in the file handle, such as the filer proxy identification field, whether the client request was directed to this filer proxy. If not, in step 570 the filer proxy executes a failover process described below with regard to FIG. 9. If the client request is determined in step 565 to be directed to this filer proxy, then the filer proxy moves to step 575.

At step 575, the redundancy/dispatch module of the filer proxy looks up the network address in the table of network addresses and associated accepted file transfer protocols. Absence of the network address from this table indicates that a different filer proxy should be handling the request. In that case, step 580, the filer proxy forwards the client request to another filer proxy. In the embodiment of the invention using WCCP, the filer proxy has data about the configuration of filer proxies in the network and is able to forward the client request on the basis of that information. Presence in the table indicates that the request could be handled in this filer proxy and the filer proxy moves to step 582. In an alternative embodiment of the invention, the table has mount points instead of network addresses and the filer proxy makes a determination from mount points.

At step 582, the filer proxy determines whether the data requested in the client request, such as file meta-data information, is in its local storage (also referred to as the local cache). If the data is in the local cache, the filer proxy proceeds to step 584. If the data is not in the local cache, the filer proxy proceeds to step 585.

At step 584, the filer proxy performs the requested operation in the client request on the data in the local cache. The filer proxy then proceeds to step 586.

At step 585, the filer proxy determines an accepted file transfer protocol using the table of network addresses and associated accepted file transfer protocols. Typical file transfer protocols are NFS and CIFS.

At step 590, the filer proxy translates, in the protocol stack, the client request into the accepted file transfer protocol and forwards the client request (or alternatively, a message requesting information) to the master filer proxy. The filer proxy then operates on the requested data. In a first embodiment, the requested data is fetched from the appropriate server using the file transfer protocols determined from the table of IP addresses and protocols. The data is cached locally in local storage and operations on the data go through the file cache controller. In a second embodiment of the invention, the data is cached at the master filer proxy and the file operation controller together with the file cache controller operate on the data. The filer proxy then proceeds to step 586.

At step 586, the filer proxy creates an update message, such as the message of FIG. 3, if the file handle and connections state table is modified as a result of the operations on the data locally in step 586 or from communications with the master filer proxy in step 590. The file synchronizer logic in the filer proxy determines whether changes have been made to the data. The file synchronizer logic determines if the data has been modified since a prior synchronization operation, and updates the data in the locations where it is stored, such as its originating filesystem and the local cache. If the client request is a request for a file lock, either directly or implicitly in a write request, the concurrency controller in the filer proxy is told by the file operations controller that the data file is being written to. As described above, the file lock is held by the master filer proxy under some circumstances and by the client in other circumstances. If locks are held, or if there is a pending file state, the file state in association with a file handle, is recorded into the file handle table. These changes to the file handle and connections state table are propagated to backup areas by the filer proxy using the update message. In one embodiment, the filer proxy sends the update message to a backup filer proxy. In the embodiment where the master filer proxy maintains backup information, the filer proxy sends an update message to the master filer proxy also. The filer proxy then proceeds to step 595.

At step 595, the filer proxy sends a response to the client in response to the client request. The type of response depends on the operation performed as a result of the client request. If the request was a file lookup request, the filer proxy responds with the file handle of the file. If the request was a read, the filer proxy responds with the data read from the file. If the request was a write request, the filer proxy responds with a confirmation of the write operation.

Figure 8:
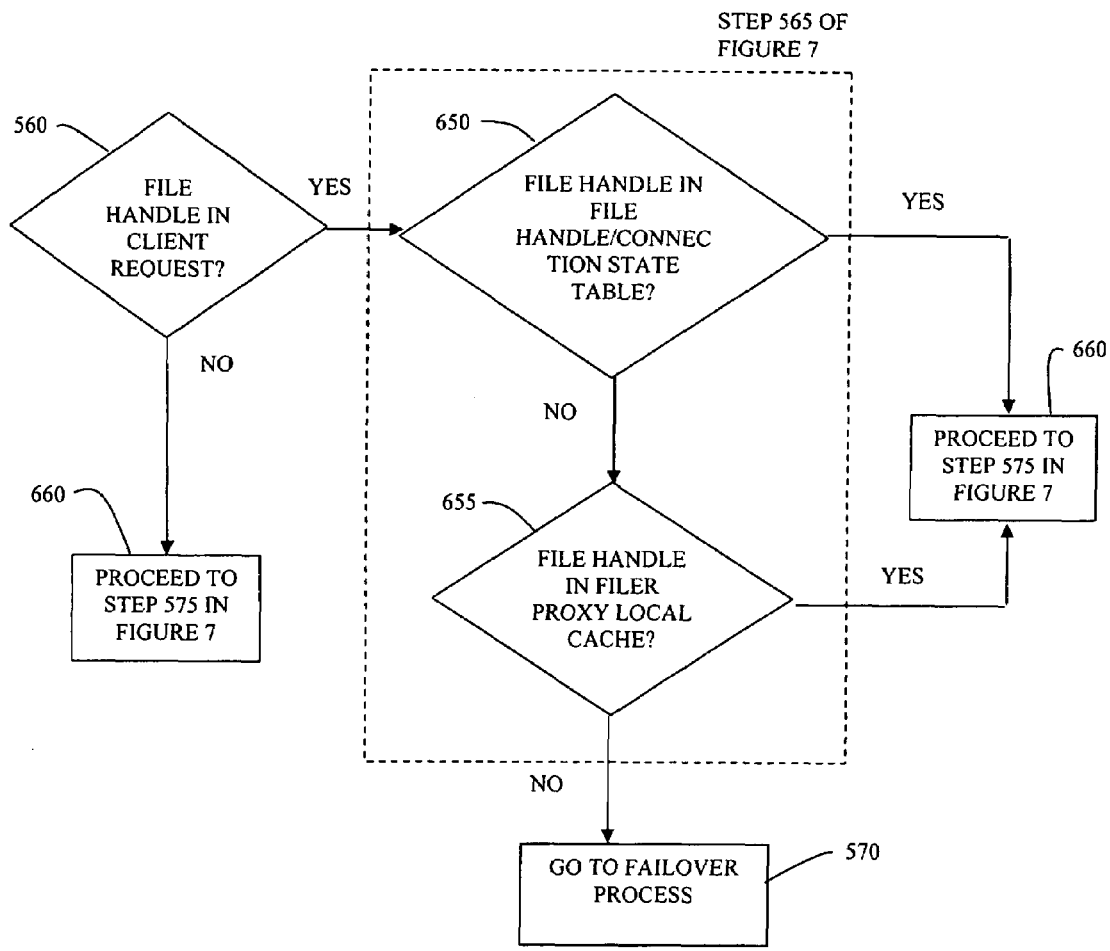
FIG. 8 is a flow chart of the method of filer proxy operation in response to a file handle in the client request according to principles of the invention.

FIG. 8 is a flow chart of the process of examining the client request for the presence of a file handle, step 565 of FIG. 7.

At step 560, the filer proxy examines the client request for a file handle. If the filer proxy finds a file handle, it proceeds to step 565 of FIG. 7 where the file redundancy/dispatch logic 235 (FIG. 2) determines whether or not the filer proxy is to handle this client request in substeps 650 and 655. First, at step 650, the file redundancy/dispatch logic module looks for a match for the file handle in the file handle/connection state table. At step 655, if there is no match in the file handle/connection state table, the file redundancy/dispatch logic module examines the filer proxy local cache for a match to the file handle. At step 660, either step 650 or 655 has produced a match for the client request file handle and the filer proxy moves to step 575 of FIG. 7. If there is no match in either step 650 or 655, then the filer proxy moves to step 570 of FIG. 7, the failover process.

If, at step 560, the filer proxy finds that there is no file handle in the client request, the filer proxy proceeds to step 575.

Figure 9:
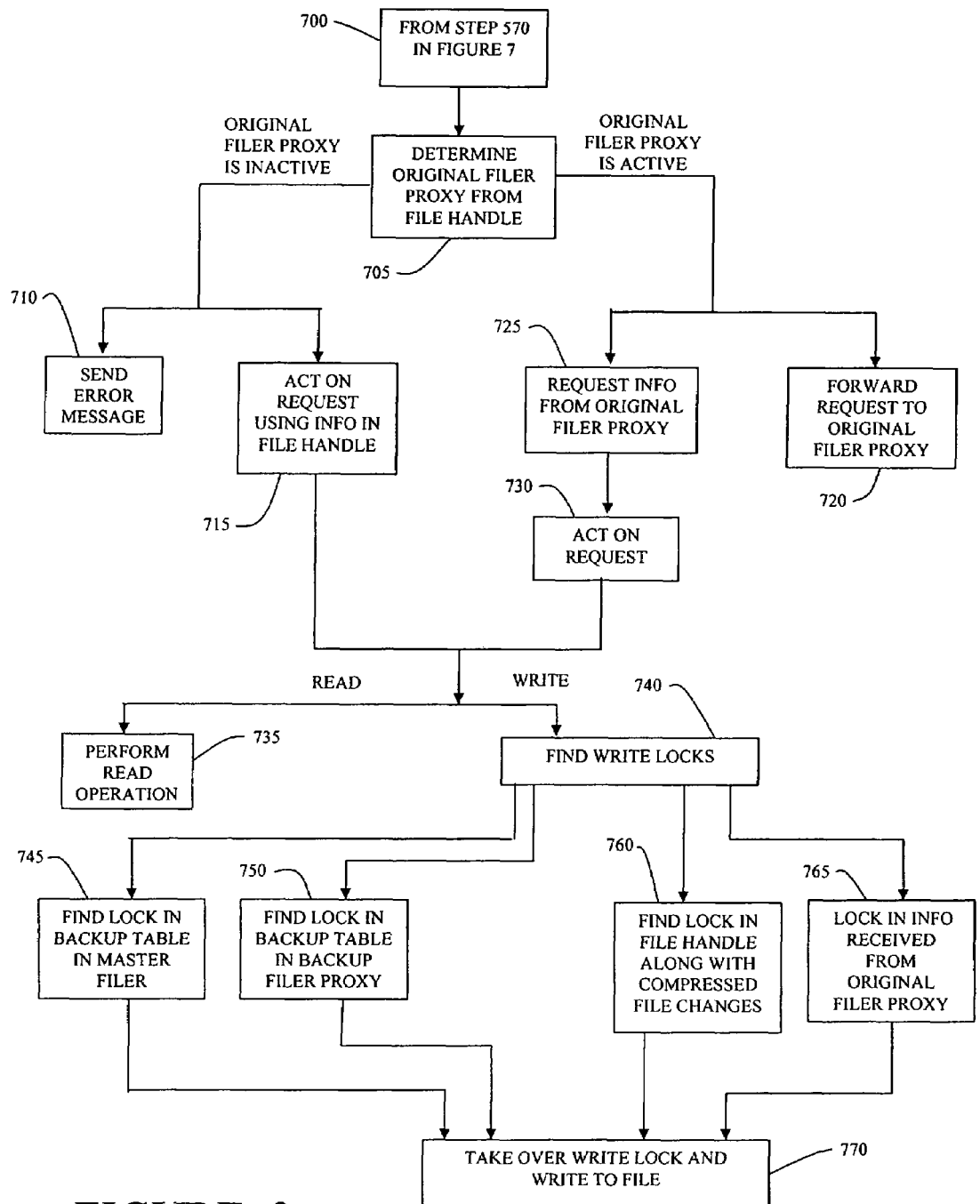
FIG. 9 is a flow chart of the failover process in the filer proxy of FIG. 1.

FIG. 9 is a flow chart of the failover process continued from the process of FIG. 7. At step 700 the failover process continues from step 570 of FIG. 7. The filer proxy receiving the client request will be referred to as the receiving filer proxy.

At step 705, the receiving filer proxy determines an original filer proxy for the received client request. The receiving filer proxy determines the original filer proxy from the file proxy identification in the file handle of the client request. The receiving filer proxy determines if the original filer proxy is active or inactive. There are known techniques for determining active or inactive devices in a network.

At step 710, in one embodiment of the invention, if the original filer proxy is found to be inactive, the receiving filer proxy sends an error message to the client.

At step 715, in an alternative embodiment of the invention, if the original filer proxy is found to be inactive, the receiving filer proxy acts on the client request using information from the file handle. As described above, there are a number of possible sources of file handle information depending on the particular embodiment of the invention being implemented. In one embodiment, the receiving filer proxy fetches the file handle from the backup filer proxy. In another embodiment, the receiving filer proxy fetches the file handle from the master filer proxy.

At step 720, in another embodiment of the invention, if the original filer proxy is found to be active, the receiving filer proxy forwards the received client request to the original filer proxy. At step 725, in another embodiment of the invention, if the original filer proxy is found to be active, the receiving filer proxy requests information from the original filer proxy in order to act on the client request. The requested information is typically file lock information and file difference information. At step 730, the receiving filer proxy uses the information received from the original filer proxy to act on the client request.

In acting on the client request, steps 715 and 730, the receiving filer proxy perform either reads or writes. In step 735, the client request is a read and the receiving filer proxy performs the read operation. At step 740, the client request is a write operation and the receiving filer proxy looks for the lock information for the file. There are several alternative embodiments for obtaining file lock information.

At step 745, in a first alternative embodiment for obtaining file lock information, the receiving filer proxy queries the master filer proxy for file lock information. In this embodiment, the master filer proxy has a backup table of file lock information.

At step 750, in a second file lock information embodiment, the receiving filer proxy obtains, where the original filer proxy is still active, the file lock information from the table in the original filer proxy. Using the proxy identification number encoded in the file handle, the receiving filer proxy is able to request from the original filer proxy lock state and compressed file differences. With this information, the receiving filer proxy can bring itself up-to-date relative to the original filer proxy and take over the file locks and proxy the file in the place of the original filer proxy.

At step 760, in a third embodiment, the receiving filer proxy obtains the file lock information from the file handle in the client request. In a further alternative embodiment, the file handle also contains compressed file changes.

At step 765, in a fourth embodiment, the receiving filer proxy obtains the file lock information from the original filer proxy, where the original filer proxy is still active. The receiving filer proxy sends a request for information to the original filer proxy and receives in a response the filer proxy information in an update message such as the message of FIG. 3.

At step 770, the receiving filer proxy takes over the file write lock and writes to the file.

In sum, the present invention provides a distributed network-attached storage network where remote files are accessible using conventional file transfer protocols such as NFS and CIFS. The file proxies encode additional information to the conventional object identification number in order to accomplish efficient proxying and effective failovers from one filer proxy to another in the event of a network error or filer proxy failure. Specifically, each filer proxy encodes its own unique proxy ID into the file handle, combined with the other information typically encoded into NFS file handles such as i-node number, generation number, mount point, a client verification number, among other things.

The additional file handle information encoded redundantly enables a second filer proxy to act on a request it receives that are from a client that obtained its file handles from a first filer proxy. This may occur due to route errors, network topology changes, the failure of first filer proxy, relocation of the client within the network, WCCP/router failures, as well as other causes.

An advantage of the present invention is that it improves on existing D-NAS designs that have filer proxies coordinating with each other, but which require clients in each location to be configured specifically to mount from a designated local filer proxy. By making anycast and WCCP operate with filer proxies for the NFS protocol in particular, the present D-NAS network provides content routing capabilities using conventional file transfer protocols such as NFS (and CIFS), but without the overhead or compatibility problems of forcing clients to use URLs and web protocols as required in conventional content routed networks.

Alternative embodiments of the invention include an embodiment where the filer proxy controllers and tables are implemented in software and storable on a computer-readable medium to be downloaded and executed by a computer system.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a distributed network-attached storage system that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a distributed network-attached storage system that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. In a first filer proxy, a method for handling a client request, comprising the steps of:

peering with a router in a computer network to provide a path directed to a filesystem attached to said computer network, said filesystem having a network address;

receiving a client request from a client for a file in said filesystem, said client request including said network address;

determining in response to said client request an accepted file transfer protocol for said network address; and forwarding said client request using said accepted file transfer protocol to a destination based on said network address;

wherein said determining step further comprises the steps of:

determining a client request file transfer protocol of said client request; and determining a requester identity;

wherein the method further comprises the step of:

creating a file handle to represent an open file opened in response to said client request, said file handle including said client request file transfer protocol and said requestor identity;

wherein creating the file handle further comprises:

including within the file handle an object identification number temporarily assigned to the file opened in response to said client request;

including within the file handle a network location of the file opened in response to said client request, the network location of the file identifying the location within the computer network where the file is stored;

including within the file handle a first filer proxy identification number and a second filer proxy identification number, the first filer proxy identification number identifying the first filer proxy, and the second filer proxy identification number identifying a second filer proxy;

including within the file handle a generation count of the file opened in response to said client request;

including within the file handle a verifying code; and including within the file handle a client identification number.

2. The method of claim 1 wherein said peering step further comprises advertising to a router in said computer network that the first filer proxy is a low-cost route to said filesystem.

3. The method of claim 1 wherein said peering step further comprises instructing a router in said computer network, using Web Cache Communication Protocol, to forward requests for said filesystem to the first filer proxy.

4. The method of claim 3 wherein said router is part of a service group of routers in said computer network and said instructing step further comprises the steps of:
sending notification to a service group address which provides information to all routers in said service group, said notification including router configuration for said routers in said service group and filer proxy configuration for the first filer proxy;
receiving from said routers in said service group a list of filer proxy addresses configured in said service group; and,
providing a policy to said service group for routers in said service group to follow in redirecting data packets in said computer network.

5. The method of claim 1 wherein said path is directed to an anycast address for a range of network addresses.

6. The method of claim 1 wherein said path is directed to an anycast address for a partition group connected to said computer network.

7. The method of claim 1 wherein said filesystem is part of a network-attached storage system.

8. The method of claim 1 wherein said determining step further comprises looking up said accepted file transfer protocol in a table of network addresses and associated file transfer protocols.

9. The method of claim 1 wherein said determining step further comprises looking up said accepted file transfer protocol in table of mount points with associated file protocols.

10. The method of claim 1 further comprising the step of determining, before forwarding said client request to said network address, whether said client request should be handled by a second filer proxy and if so, forwarding said client request to said second filer proxy instead of to said network address.

11. The method of claim 10 further comprising the step of forwarding said client request to a second filer proxy if said network address is not found in a table of addresses in the first filer proxy.

12. The method of claim 1 further comprising the steps of:
maintaining in a table said file handle associated with a connection control state for said open file; and
forwarding said file handle to said client to use for operations on said open file.

13. The method of claim 12 wherein said file handle further includes a hash count, said client identification number and said hash count for verifying said file handle.

14. The method of claim 12 wherein said file handle includes an i-node of said file.

15. The method of claim 12 wherein said file handle further includes a mount point of said file and a hash count for verifying said file handle.

16. The method of claim 1 further comprising the step of holding a lock on a file opened in response to said client request, to enable concurrent usage of the file among clients.

17. The method of claim 16 further comprising storing said file lock in association with a file handle of the file.

18. The method of claim 1, further comprising the steps of:
synchronizing a file opened in response to said client request by determining if changes have been made to the file since a prior synchronization; and
if changes have been made to the file since said prior synchronization, replacing said file with a new file incorporating said changes.

19. The method of claim 1, further comprising the steps of:
in the second filer proxy,
after the first filer proxy fails to respond to a second client request for an operation on said file, receiving said second client request, said second client request including said file handle;
reading information from said file handle; and
acting on said second client request in response to said information.

20. The method of claim 19, further comprising the steps of:
in said second filer proxy,
detecting that the first filer proxy is operational; and,
forwarding said second client request to the first filer proxy.

21. The method of claim 19, further comprising the steps of:
in said second filer proxy,
detecting that the first filer proxy is operational;
requesting in response to said second file request, a file handle entry from the first filer proxy; and
receiving from the first filer proxy said file handle entry.

22. The method of claim 21, wherein said file handle entry includes a lock state and compressed file differences for said file.

23. The method of claim 19, wherein the step of acting on said second request further comprises the steps of:
in the second filer proxy,
detecting that the first filer proxy is inoperational;
determining whether the second file request is a read operation, and
if so, proceeding with a read operation on said file.

24. The method of claim 19, wherein the step of acting on said second request, further comprising the steps of:
in the second filer proxy,
detecting that the first filer proxy is inoperational;
determining whether said second file request is a write operation; and
if so, then determining whether said file has file locks;
if so, then taking ownership of said file locks; and
proceeding with said write operation.

25. The method of claim 24 further comprising the steps of:
in the first filer proxy,
duplicating file lock information into said file handle; and
in said second filer proxy,
said step of determining file locks further comprises the step of reading said file lock information from said file handle.

26. The method of claim 24, further comprising the steps of:
in the first filer proxy,
duplicating file lock information into a backup table at a master filer;
and
in the second filer proxy,
reading said file lock information from said master filer backup table.

27. The method of claim 24, wherein said step of determining file locks per client further comprises the step of:
in the first filer proxy,
duplicating file lock information for said client into a backup table at a master controller;
and
in the second filer proxy, reading said file lock information from said master controller backup table.

28. The method of claim 24, wherein said step of determining file locks per proxy per partition group further comprises the steps of:
in the first filer proxy,
duplicating file lock information in said file handle; and
in the master filer,
making a file handle/control state entry for said open file for a second filer proxy.

29. The method of claim 1, further comprising the steps of:
in the second filer proxy,
after the first filer proxy fails to respond to a second client request for an operation on said file, receiving said second client request, said second client request including said file handle;
generating an error message; and
forwarding said error message to the client.

30. A filer proxy, comprising:
at least one communications interface for receiving a client request and for transmitting data in response to said client request;
a protocol stack connected to said at least one communications interface, said protocol stack to determine an accepted file transfer protocol at a filesystem specified in said client request;
a file operation controller connected to said protocol stack to forward said client request to said filesystem in said accepted file transfer protocol through said at least one communications interface; and
a file handle and connection state table connected to said file operation controller, said file handle and connection state table to hold a file handle of an open file opened in response to said client request in association with a connection state of said open file;
wherein the file handle includes:
an object identification number temporarily assigned to the file opened in response to said client request;
a network location of the file opened in response to said client request, the network location of the file identifying the location within the computer network where the file is stored;
a first filer proxy identification number and a second filer proxy identification number, the first filer proxy identification number identifying the filer proxy, and the second filer proxy identification number identifying a second filer proxy;
a generation count of the file opened in response to said client request;
a verifying code; and
a client identification number.

31. The filer proxy of claim 30, wherein said protocol stack further comprises:
at least one file transfer protocol module to determine an incoming file transfer protocol of said client request, to determine said accepted file transfer protocol, and to translate said client request to a format of said accepted file transfer protocol.

32. The filer proxy of claim 31, wherein said protocol stack further comprises:
a Network File System module to determine whether said client request is in Network File System format and to translate said client request to Network File System format if said filesystem accepts data in Network File System format; and
a Common Internet File System module to determine whether said client request is in Common Internet File System format and to translate said client request to Common Internet File System format if said filesystem accepts data in Common Internet File System format.

33. The filer proxy of claim 30, wherein the protocol stack further comprises:
a table of filesystem addresses and associated accepted file transfer protocols for said protocol stack to use to determine said accepted file transfer protocol for said filesystem specified in said client request.

34. The filer proxy of claim 30, further comprising:
a lock and concurrency controller connected to said file operation controller and said file handle and connection state table to control operations to said open file and to maintain concurrency of said open file with said file in said filesystem.

35. The filer proxy of claim 30, further comprising:
a redundancy/dispatch logic module to determine whether said received client request should be handled in the filer proxy and to forward said client request to the second filer proxy if not.

36. The filer proxy of claim 30, further comprising:
a file cache controller connected to said file operation controller, said file cache controller to control caching of said open file in a local storage module connected to the filer proxy.

37. The filer proxy of claim 36, further comprising:
a file synchronizer logic module connected to said file cache controller and to a lock and concurrency controller, said file synchronizer logic module to take inputs from said file cache controller and said lock and concurrency controller to synchronize said open file to said file in said filesystem.

38. A master filer, comprising:
a memory; and
a controller coupled to said memory, said controller configured to:
manage filesystems attached to a computer network,
manage filer proxies attached to said computer network, and
manage open files from said filesystems,
the master filer to receive a client request forwarded from a filer proxy, the client request transferred to the master filer in a file transfer protocol, the master filer to open a requested file and to provide information to said filer proxy with which to generate a file handle containing redundant proxy information, the file transfer protocol being determined by the filer proxy;
wherein the file handle includes:
an object identification number temporarily assigned to the requested file;
a network location of the requested file, the network location of the file identifying the location within the computer network where the file is stored;
a first filer proxy identification number and a second filer proxy identification number;
a generation count of the requested file;
a verifying code; and
a client identification number.

39. The master filer of claim 38 further comprising a local cache coupled to the master filer.

40. The master filer of claim 38 further comprising a table of mount points and associated filesystems.

41. The master filer of claim 38 further comprising a table of filer proxies and supported mount points.

42. The master filer of claim 38 further comprising a table of locked files and associated file handles.

43. A distributed network-attached storage network, comprising:

at least one network-attached storage system attached to the network;

a master filer attached to the network, the master filer to manage said at least one network-attached storage system;

a first filer proxy attached to the network, said first filer proxy to translate a client request to a file protocol accepted by a filesystem in said at least one network-attached storage system said file system to generate with said master filer a file handle for a file opened in response to said client request, the file handle having redundant file proxying information; and a second filer proxy attached to said network, said second filer proxy capable of proxying said file using said redundant file proxying information in said file handle in the event that said first filer proxy is unable to continue proxying said file;

wherein the file handle includes:

an object identification number temporarily assigned to the file opened in response to said client request;

a network location of the file opened in response to said client request, the network location of the file identifying the location within the computer network where the file is stored;

a first filer proxy identification number and a second filer proxy identification number, the first filer proxy identification number identifying the first filer proxy, and the second filer proxy identification number identifying the second filer proxy;

a generation count of the file opened in response to said client request;

a verifying code; and a client identification number.

44. A computer program product having a computer-readable medium including computer program logic encoded thereon that, when performed on a computer system directs the computer system to perform the method of:

providing a path to a first filer proxy through a computer network, said path directed to a filesystem attached to said computer network, said filesystem having a network address;

receiving a client request from a client for a file in said filesystem, said client request including said network address;

determining in response to said client request an accepted file transfer protocol for said network address; and forwarding said client request using said accepted file transfer protocol to a destination based on said network address;

wherein said determining step further comprises the steps of:

determining a client request file transfer protocol of said client request; and determining a requester identity;

wherein the method performed on the computer system further comprises the step of:

creating a file handle to represent an open file opened in response to said client request, said file handle including said client request file transfer protocol and said requester identity;

wherein creating the file handle further comprises:

including within the file handle an object identification number temporarily assigned to the file opened in response to said client request;

including within the file handle a network location of the file opened in response to said client request, the network location of the file identifying the location within the computer network where the file is stored;

including within the file handle a first filer proxy identification number and a second filer proxy identification number, the first filer proxy identification number identifying the first filer proxy, and the second filer proxy identification number identifying a second filer proxy;

including within the file handle a generation count of the file opened in response to said client request;

including within the file handle a verifying code; and including within the file handle a client identification number.

\* \* \* \* \*